UNITED STATES PATENT OFFICE.

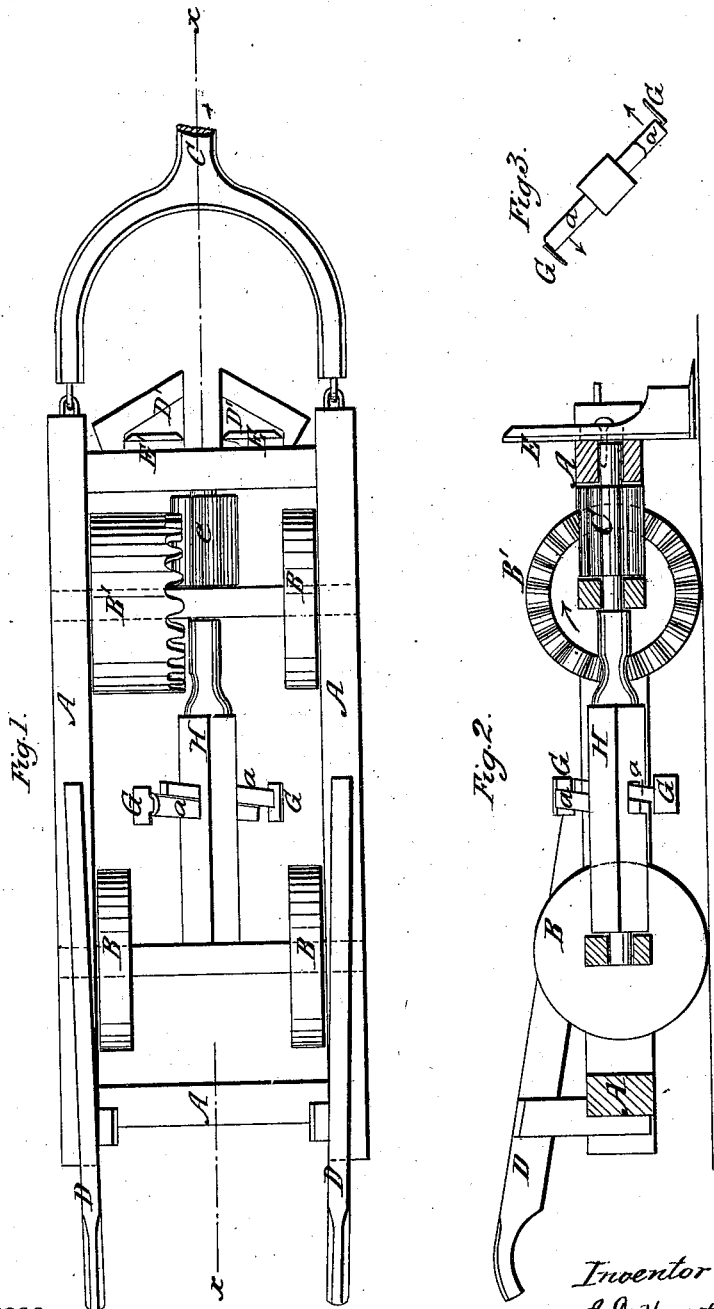

J. D. HOUSTON, OF POPE'S DEPOT, MISSISSIPPI.

IMPROVEMENT IN COTTON-SCRAPERS.

Specification forming part of Letters Patent No. 31,122, dated January 15, 1861.

*To all whom it may concern:*

Be it known that I, J. D. HOUSTON, of Pope's Depot, in the county of Panola and State of Mississippi, have invented a new and Improved Cotton-Scraper; and I do hereby declare that the following is a full, clear, and exact description thereof, reference being had to the accompanying drawings, making a part of this specification, in which—

Figure 1 is a plan view of the improved cotton-scraper. Fig. 2 is a longitudinal section taken in the vertical plane indicated by the red line $x$ $x$ in Fig. 1. Fig. 3 is an end view, in detail, of the scraper shaft with the scrapers attached to it.

Similar letters of reference indicate corresponding parts in the three figures.

The object of this invention is to construct a machine to be worked by horses for thinning out cotton-plants more rapidly and efficiently than can be done by manual labor or by machines for this purpose that are at present used.

To enable those skilled in the art to fully understand my invention, I will proceed to describe its construction and operation.

In the drawings, A is a quadrangular frame mounted on four wheels, B B B B', the latter of which is a driving-wheel. In front of the frame a draft-pole, C, is attached to, and in the rear of the frame two handles, D D, are used to control the movements of the machine. At the front end of this frame A are attached two vertical standards, E E, which carry on their lower ends two scraping wings or sweeps, 1 1, that are of a triangular shape. The standards E E are attached to the frame A in such a manner that they may be adjusted vertically to shave off the bed each side of the cotton-plants as deep as may be desired. In some instances they will only be required to skim over the surface. These standards are set some little distance apart, so that the plants to be left will pass between them and the parallel sides of the scraping-plates D' D', and the scrapings fall down into the furrows on each side of the rows. After thinning the sides of the row the plants are chopped out from the top and separated into hills or bunches of two or more stalks by the rotary hoes G G, which have the hills of the stalks the distance of the width of the hoes apart. These hoes are attached to stocks $a$ $a$, which pass through a rotary shaft, H, at right angles to its axis, and are suitably keyed to the shaft. They may be lengthened—that is, set farther from the axis of the shaft—or shortened at pleasure. The shaft to which the hoe-stocks are attached is driven by side gearing on wheel B' and a pinion spur-wheel, $c$, on the shaft H.

The wheels run in the furrows between the rows of plants, and the horses are driven by a man who walks outside of the plants, behind the machine, and who controls the machine with the handles D D.

Having thus described my invention, what I claim as new, and desire to secure by Letters Patent, is—

The arrangement of the scallop-edged driver B', pinion C, rotary shaft H, and adjustable rotary hoes G G with the adjustable scrapers D' D', frame A, wheels B B, and governing-handles D D, as herein shown and described, for the purposes set forth.

J. D. HOUSTON.

Witnesses:
W. G. LEWIS,
WILSON CARROLL.